US012678939B2

(12) United States Patent
Yoon et al.

(10) Patent No.: US 12,678,939 B2
(45) Date of Patent: Jul. 14, 2026

(54) METHOD AND SYSTEM FOR CONTROLLING ROBOT CONFIGURED WITH PLURALITY OF MODULAR ROBOTS, AND BUILDING IN WHICH ROBOT IS DISPOSED

(71) Applicant: NAVER CORPORATION, Seongnam-si (KR)

(72) Inventors: Younghwan Yoon, Seongnam-si (KR); Kay Park, Seongnam-si (KR); Inhyeok Kim, Seongnam-si (KR)

(73) Assignee: NAVER CORPORATION, Gyeonggi-do (KR)

( * ) Notice: Subject to any disclaimer, the term of this patent is extended or adjusted under 35 U.S.C. 154(b) by 351 days.

(21) Appl. No.: 18/500,888

(22) Filed: Nov. 2, 2023

(65) Prior Publication Data

US 2024/0066683 A1       Feb. 29, 2024

Related U.S. Application Data

(63) Continuation of application No. PCT/KR2022/000146, filed on Jan. 5, 2022.

(30) Foreign Application Priority Data

May 3, 2021       (KR) ........................ 10-2021-0057310

(51) Int. Cl.
B25J 9/08            (2006.01)
B25J 9/00            (2006.01)

(52) U.S. Cl.
CPC ............... B25J 9/08 (2013.01); B25J 9/0084 (2013.01)

(58) Field of Classification Search
CPC . B25J 9/0084; B25J 9/08; G05B 2219/39146; G05B 2219/40304
See application file for complete search history.

(56) References Cited

U.S. PATENT DOCUMENTS

| | | | | | |
|---|---|---|---|---|---|
| 11,407,118 | B1* | 8/2022 | Augenbraun | .......... | B25J 9/1612 |
| 2004/0098167 | A1* | 5/2004 | Yi | .......... | G06N 3/008 |
| | | | | | 700/245 |
| 2007/0112463 | A1* | 5/2007 | Roh | .......... | B25J 9/1656 |
| | | | | | 700/245 |
| 2020/0055183 | A1* | 2/2020 | Ito | .......... | B25J 13/00 |
| 2022/0324646 | A1* | 10/2022 | Sohn | .......... | G06Q 30/0601 |

FOREIGN PATENT DOCUMENTS

| | | |
|---|---|---|
| JP | 2004-306242 A | 11/2004 |
| JP | 2007130722 A | 5/2007 |
| JP | 2007-136665 A | 6/2007 |

(Continued)

OTHER PUBLICATIONS

Office Action for Japanese Application No. 2023-567961 dated Nov. 12, 2024.
ISR issued in PCT/KR2022/000146, mailed Aug. 3, 2022.

*Primary Examiner* — Dale Moyer
(74) *Attorney, Agent, or Firm* — Harness, Dickey & Pierce, P.L.C.

(57) ABSTRACT

A method for controlling a robot having a plurality of modular robots for performing requested service-related tasks includes individually controlling each of the plurality of modular robots through a robot control system without interactions between the plurality of modular robots.

20 Claims, 10 Drawing Sheets

(56)            References Cited

FOREIGN PATENT DOCUMENTS

| JP | 2019010701 | A | 1/2019 |
| KR | 1020050024840 | A | 10/2005 |
| KR | 1020170100028 | A | 9/2017 |
| KR | 1020180132186 | A | 12/2018 |
| KR | 1020200013581 | A | 2/2020 |

* cited by examiner

Figure 1:
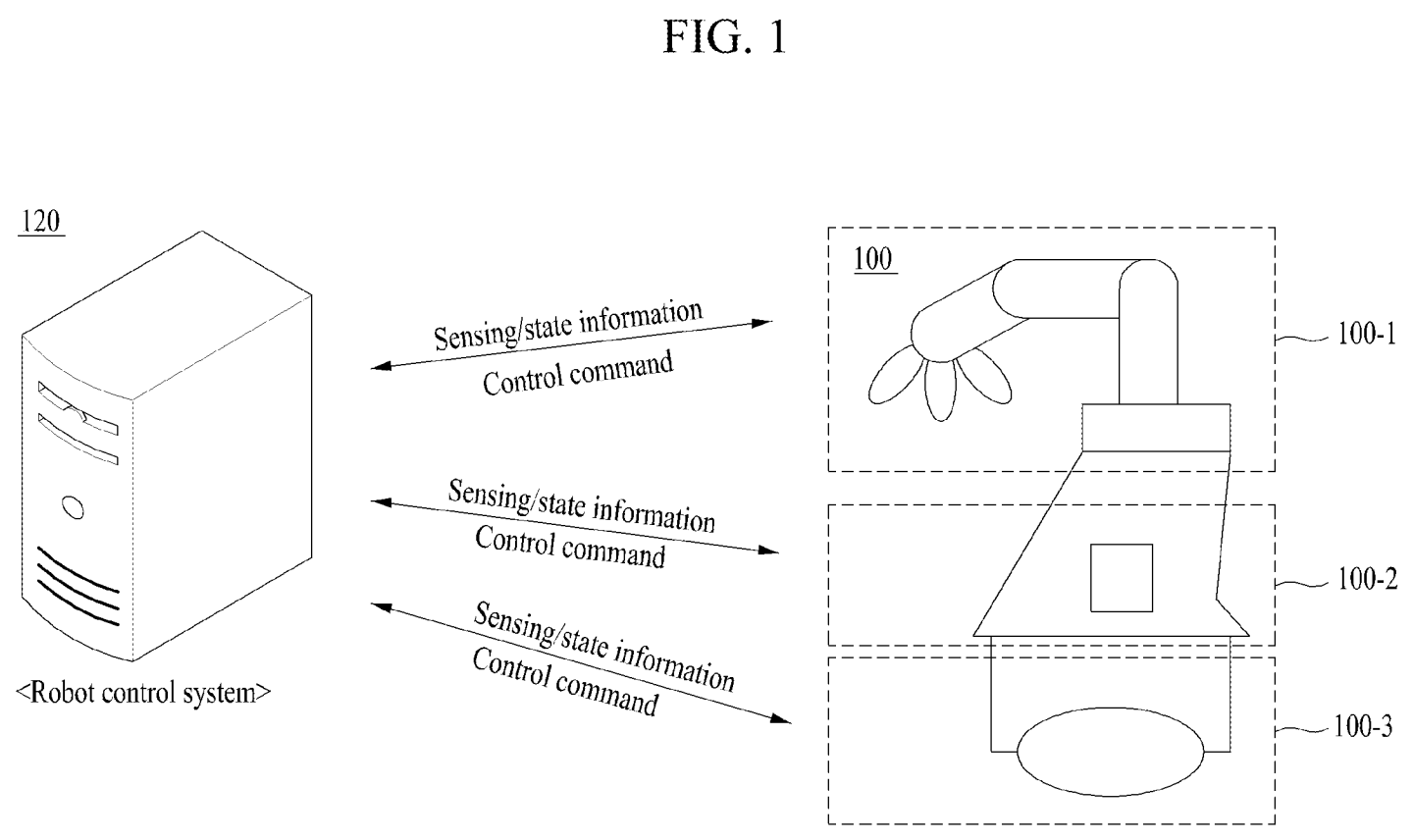

Sensing/state information

Control command

Sensing/state information

Control command

Sensing/state information

Control command

120

\<Robot control system\>

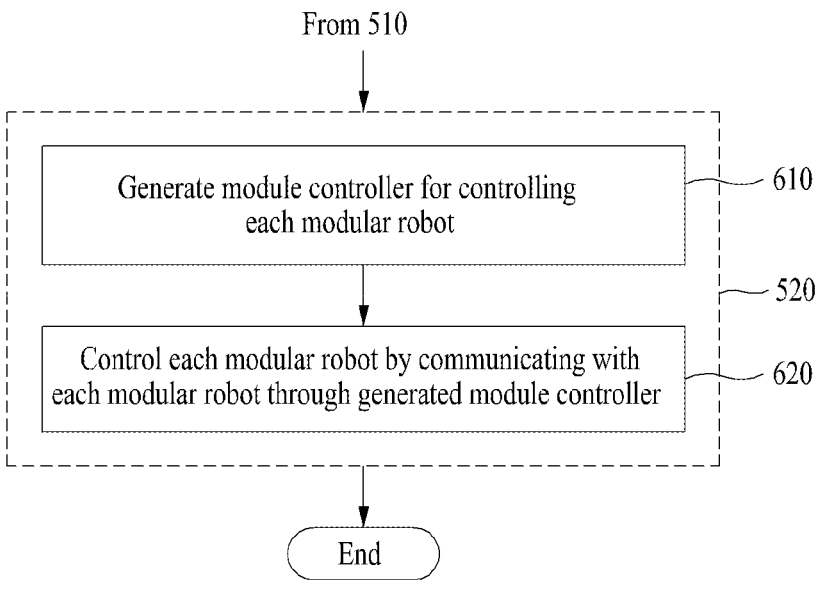

From 510

Generate module controller for controlling each modular robot — 610

— 520

Control each modular robot by communicating with each modular robot through generated module controller — 620

End

FIG. 7

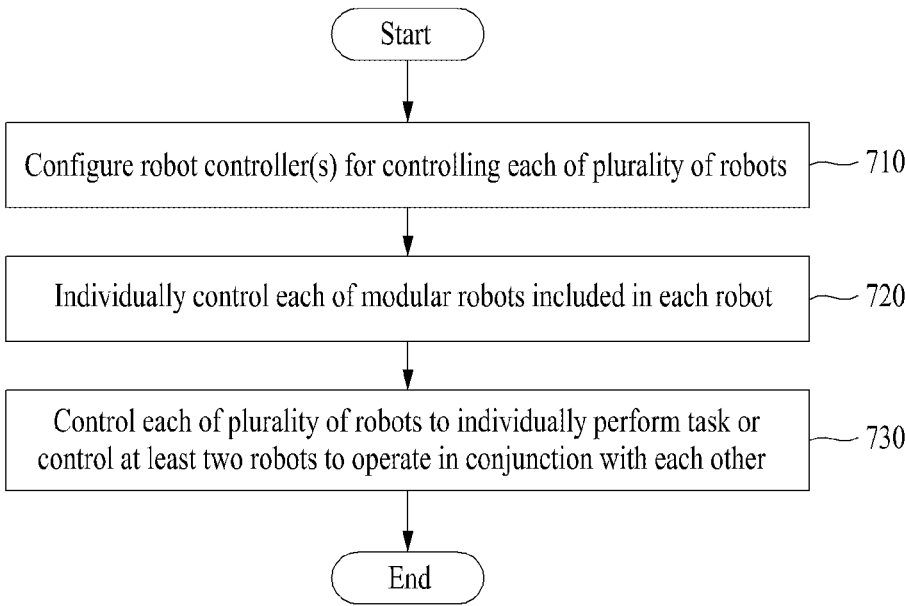

Start

Configure robot controller(s) for controlling each of plurality of robots — 710

Individually control each of modular robots included in each robot — 720

Control each of plurality of robots to individually perform task or control at least two robots to operate in conjunction with each other — 730

End

FIG. 9

METHOD AND SYSTEM FOR CONTROLLING ROBOT CONFIGURED WITH PLURALITY OF MODULAR ROBOTS, AND BUILDING IN WHICH ROBOT IS DISPOSED

CROSS-REFERENCE TO RELATED APPLICATIONS

This is a continuation application of International Application No. PCT/KR2022/000146, filed Jan. 5, 2022, which claims the benefit of Korean Patent Application No. 10-2021-0057310, filed May 3, 2021.

BACKGROUND OF THE INVENTION

Field of Invention

The following description relates to a method and system for controlling a robot configured with a plurality of modular robots.

Description of Related Art

There is a growing interest in robots that provide services, such as manufacturing, logistics, transportation, cleaning, and path guidance. A robot implemented to provide such a service may move to a destination in an optimal path through autonomous driving using, for example, wheels or legs, and may provide a service at the destination. For the robot to provide the service, functions provided from various components of the robot need to interact. To configure the robot such that such interaction between the functions is performed on the robot complicates implementation of the robot and also increases maintenance cost of the robot and degrades scalability of the robot.

Therefore, to reduce implementation cost of the robot and facilitate maintenance and scalability of the robot, the robot and a robot control system need to be built such that interaction between functions of the robot for providing a service and processing of operations for controlling the robot may be performed on a server.

Korean Patent Laid-Open Publication No. 10-2005-0024840 relates to technology related to a path planning method for autonomous mobile robot and describes a method of planning an optimal path through which a mobile robot autonomously moving in a home or office may safely and quickly move to a target point while avoiding obstacles.

The aforementioned information is provided to simply help understanding and may include contents that do not form a part of the related art and may not include contents that may be provided by one skilled in the art.

BRIEF SUMMARY OF THE INVENTION

Example embodiments provide a method of controlling a robot to perform a task related to a requested service by individually controlling each of a plurality of modular robots through a robot control system without interaction between the plurality of modular robots, when controlling the robot configured with the plurality of modular robots.

Example embodiments provide a method of controlling robots such that each of the plurality of robots may independently process an assigned task (in association with a service) or the plurality of robots may operate in conjunction with each other by individually controlling each of a plurality of modular robots, when controlling the plurality of robots configured with the plurality of modular robots.

Example embodiments provide a robot configured with a plurality of modular robots and configured such that each modular robot transmits sensing information and state information to a robot control system and executes a command from the robot control system and does not directly interact (interwork or communicate) with another modular robot.

According to an aspect of the embodiments of the invention, there is provided a method of controlling a robot configured with a plurality of modular robots, performed by a robot control system, the method including receiving first sensing information or first state information from a first modular robot that performs a first function among the plurality of modular robots and receiving second sensing information or second state information from a second modular robot that performs a second function among the plurality of modular robots; and controlling the first modular robot by transmitting a first command to the first modular robot based on the first sensing information or the first state information, and controlling the second modular robot by transmitting a second command to the second modular robot based on the second sensing information or the second state information, wherein each of the first modular robot and the second modular robot is individually controlled by the robot control system without interaction between the first modular robot and the second modular robot such that the robot is controlled to perform a task related to a service requested for the robot.

Each of the plurality of modular robots may be a brainless robot that is controlled by executing a command from the robot control system, without interaction with another robot or another modular robot.

The method of controlling the robot may further include receiving a request for the task related to the service requested for the robot, wherein the controlling of the first modular robot and the second modular robot may include generating the first command based on a result of interpreting the request and the first sensing information or the first state information; and generating the second command based on a result of interpreting the request and the second sensing information or the second state information.

The generating of the first command may include generating the first command using information obtained from a predefined first functional element in association with the first function, and the generating of the second command may include generating the second command using information obtained from a predefined second functional element in association with the second function.

The generating of the second command may include generating the second command by further using the first sensing information or the first state information, and the second modular robot may be controlled according to the second command generated by further using the first sensing information or the first state information.

The method of controlling the robot may further include configuring the first module controller for controlling the first modular robot and the second module controller for controlling the second modular robot, wherein the first sensing information or the first state information may be received from the first modular robot and the first command may be transmitted to the first modular robot using the first module controller corresponding to the first modular robot, the second sensing information or the second state information may be received from the second modular robot and the second command may be transmitted to the second modular robot using the second module controller corresponding to the second modular robot, and the first module controller and the second module controller may correspond to the first modular robot and the second modular robot on a one-to-one basis, respectively.

The method of controlling the robot may further include, in response to a request for control of a third modular robot that performs a third function among the plurality of modular robots to perform the task, configuring a third module controller for controlling the third modular robot, wherein the third module controller may correspond to the third modular robot on a one-to-one basis.

Each of the first modular robot and the second modular robot may communicate with the robot control system using a shared communicator, and reception of the first sensing information or the first state information, reception of the second sensing information or the second state information, transmission of the first command, and transmission of the second command may be performed through the shared communicator.

The robot control system may be configured to further control another robot configured with a plurality of other modular robots, and each of the plurality of other modular robots may be individually controlled by the robot control system without interaction between the plurality of other modular robots such that the other robot is controlled to perform another task related to a service requested for the other robot.

Each of the robot and the other robot may be controlled by a robot controller independently configured in the robot control system.

Each of the robot and the other robot may be controlled by a common robot controller of the robot control system, the task and the other task may be interrelated tasks, the robot and the other robot may configure a single virtual robot, and the robot and the other robot may be controlled to operate in conjunction with each other.

The first function may be a function for moving the robot and the first modular robot may be a mobile base modular robot configured to move the robot, the second function may be a function for providing the service and the second modular robot may be a service modular robot configured to provide the service of the robot, and the robot may be configured through combination of the first modular robot and the second modular robot.

According to another aspect, there is provided a robot control system for controlling a robot configured with a plurality of modular robots, the robot control system including at least one processor configured to execute computer-readable instructions, wherein the at least one processor is configured to receive first sensing information or first state information from a first modular robot that performs a first function among the plurality of modular robots, receive second sensing information or second state information from a second modular robot that performs a second function among the plurality of modular robots, control the first modular robot by transmitting a first command to the first modular robot based on the first sensing information or the first state information, and control the second modular robot by transmitting a second command to the second modular robot based on the second sensing information or the second state information, and each of the first modular robot and the second modular robot is individually controlled by the robot control system without interaction between the first modular robot and the second modular robot such that the robot is controlled to perform a task related to a service requested for the robot.

The at least one processor may include the first module controller for controlling the first modular robot and the second module controller for controlling the second modular robot, the first module controller corresponding to the first modular robot may be configured to receive the first sensing information or the first state information from the first modular robot and transmit the first command to the first modular robot, the second module controller corresponding to the second modular robot may be configured to receive the first sensing information or the first state information from the first modular robot and transmit the first command to the first modular robot, the first module controller and the second module controller may correspond to the first modular robot and the second modular robot on a one-to-one basis, respectively, and in response to a request for control of a third modular robot that performs a third function among the plurality of modular robots to perform the task, the at least one processor may be configured to generate a third module controller for controlling the third modular robot.

The at least one processor may be configured to further control another robot configured with a plurality of other modular robots, and each of the plurality of other modular robots may be individually controlled by the robot control system without interaction between the plurality of other modular robots such that the other robot is controlled to perform another task related to a service requested for the other robot.

The at least one processor may include a first robot controller configured to control the robot and a second robot controller configured to control the other robot, and the first robot controller and the second robot controller may be independently configured.

The at least one processor may include a common robot controller, each of the robot and the other robot may be controlled by the common robot controller, the task and the other task may be interrelated tasks, the robot and the other robot may configure a single virtual robot, and the robot and the other robot may be controlled to operate in conjunction with each other.

According to still another aspect, there is provided a robot controlled by a robot control system to provide a service within a space, the robot including a plurality of modular robots, wherein each of the plurality of modular robots is individually controlled by the robot control system without interaction between the plurality of modular robots, each modular robot of the plurality of modular robots is configured to perform a function for providing the service, and the each modular robot includes at least one processor configured to execute computer-readable instructions, and the at least one processor is configured to transmit sensing information or state information of the each modular robot to the robot control system, receive a command from the robot control system based on the sensing information or the state information, and control the each modular robot according to the command.

In the robot, a first modular robot among the plurality of modular robots may include a shared communicator, and remaining modular robots of the plurality of modular robots may be configured to connect to the first modular robot through a connector and communicate with the robot control system through the shared communicator.

The plurality of modular robots may include a mobile base modular robot configured to provide a function for moving the robot; and a service modular robot configured to provide a function for providing the service, and the robot may be configured through combination of the mobile base modular robot and the service modular robot.

According to example embodiments, it is possible to reduce complexity of a service robot and make maintenance of the service robot efficient by implementing the service robot using a modular robot configured to transmit sensing information and state information to a robot control system and execute a command from the robot control system and not to directly interact with another modular robot.

According to example embodiments, it is possible to provide a service robot configured with modular robots each of which may be distributed and controlled by a robot control system (server) without depending on another modular robot.

According to example embodiments, it is possible to improve scalability of a service robot using the service robot configured with modular robots individually controllable by a robot control system.

BRIEF DESCRIPTION OF THE DRAWINGS

FIG. 1 is a diagram for illustrating a method of controlling a robot configured with a plurality of modular robots according to an example embodiment.

FIG. 6 is a flowchart illustrating a method of generating a module controller for controlling each of modular robots and controlling each modular robot according to an example.

FIG. 7 is a flowchart illustrating a method of controlling a plurality of robots by individually controlling modular robots included in each robot according to an example.

FIG. 9 is a diagram for illustrating a method of individually controlling, by a robot control system, each of a plurality of modular robots constituting a robot according to an example.

DETAILED DESCRIPTION OF THE INVENTION

Figure 2:
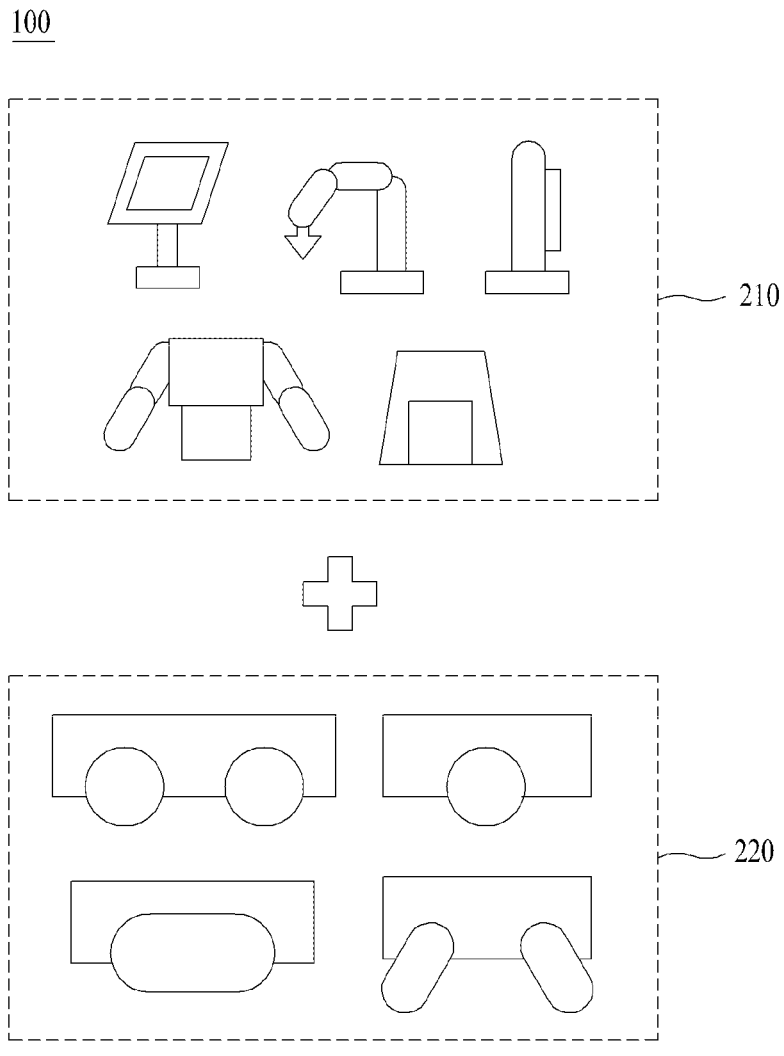
FIG. 2 is diagram of a robot configured with modular robots according to an example.

Hereinafter, example embodiments are described with reference to the accompanying drawings.

FIG. 1 illustrates a method of controlling a robot configured with a plurality of modular robots according to an example embodiment.

FIG. 1 illustrates a method of operating a robot 100 configured to provide a service within a space, such as a building, under the control of a robot control system 120.

Referring to FIG. 1, the robot 100 may be configured with a plurality of modular robots 100-1, 100-2, and 100-3 (100-1 to 100-3). Although FIG. 1 illustrates the robot 100 includes only three modular robots 100-1 to 100-3, the number of modular robots included in the robot 100 may vary according to the type of a service provided from the robot 100 or the type of a task performed by the robot 100.

Each of the modular robots 100-1 to 100-3 may be configured to perform a function required for the robot 100 to provide a service or perform a task for providing the service.

For example, as illustrated, the modular robots 100-3 may perform a function for moving the robot 100, the modular robots 100-2 may perform a function of opening/closing a door to provide the service (e.g., to load cargo or deliver goods), and the modular robots 100-1 may perform a function of controlling a robot arm for the robot 100 to provide the service (e.g., to grip cargo or deliver goods).

The robot 100 may be configured through combination of the modular robots 100-1 to 100-3 and may be configured to provide a service (or perform a task for providing the service) as functions provided from the modular robots 100-1 to 100-3 are performed in conjunction with each other.

A space as a place in which the robot 100 provides a service may represent, for example, a building. The building refers to a space in which a plurality of personnel (hereinafter, users) works or resides and may include a plurality of partitioned spaces. The space may represent a portion (specific floor or partial space within the corresponding floor) of the building.

The robot 100 may be a service robot used to provide the service within the space. The robot 100 may be configured to provide the service on at least one floor of the space. A plurality of robots 100 may run within the space.

The service provided from the robot 100 may include, for example, at least one of a goods delivery service, a beverage (coffee, etc.) delivery service, a cleaning service, a path guidance service, and other information/content provision (display) services.

The robot 100 may provide the service at a predetermined location within the space through autonomous driving.

Movement and service provision of the robot 100 may be controlled by the robot control system 120.

As illustrated, in an example embodiment, the robot control system 120 may individually control each of the modular robots 100-1 to 100-3.

For example, the robot control system 120 may receive sensing information and/or state information from each of the modular robots 100-1 to 100-3 and may generate a (control) command for controlling each of the modular robots 100-1 to 100-3 based on the received sensing information and/or state information. The generated command may be transmitted to each of the modular robots 100-1 to 100-3. The modular robot 100-1 to 100-3 may execute the received command and may be controlled according to the command.

Although each of the modular robots 100-1 to 100-3 is individually controlled according to the received command, the modular robots 100-1 to 100-3 as a whole may perform a task related to the requested service (e.g., task required to provide the service). Therefore, the robot 100 may operate as a single robot that performs the task related to the requested service.

In an example embodiment, although each of the modular robots 100-1 to 100-3 does not directly interact (interwork or communicate) with other modular robots that constitute the robot 100, the modular robots 100-1 to 100-3 may be controlled in conjunction with each other to perform the task related to the requested service.

That is, in reality, the robot control system 120 may individually control each of the modular robots 100-1 to 100-3 and each of the modular robots 100-1 to 100-3 may execute the command from the robot control system 120, but the robot 100 may be controlled as if the modular robots 100-1 to 100-3 operate in conjunction with each other.

Detailed operation of the robot 100 configured with the plurality of modular robots and the robot control system 120 that controls the robot 100 are further described with reference to FIGS. 2 to 11.

FIG. 2 illustrates a robot configured with modular robots according to an example.

As described above with reference to FIG. 1, the robot 100 may be configured with a plurality of modular robots. For example, the plurality of modular robots may include a first modular robot and a second modular robot. Here, the first modular robot may be configured to perform a first function for performing a task related to a service performed by the robot 100. The second modular robot may be configured to perform a second function for performing a task related to the service performed by the robot 100. The first function and the second function may be independently performed. That is, without interaction (e.g., direct communication) between the first modular robot and the second modular robot, the first modular robot and second modular robot may be individually controlled by the robot control system 120 to perform the first function and the second function, respectively. Accordingly, the robot 100 may be controlled to perform the task related to the service requested for the robot 100. Each of the first modular robot and the second modular robot may be one of the plurality of modular robots that constitutes the robot 100.

For example, the first function performed by the first modular robot may relate to moving the robot 100. Here, the first modular robot may be one of mobile base modular robots 220 configured to move the robot 100. For example, the first modular robot may include a modular robot for walking of the robot 100 or a modular robot for driving using wheels or caterpillar wheels of the robot 100.

Meanwhile, the second function performed by the second modular robot may relate to a function for providing the requested service, and the second modular robot may be one of service modular robots 210 configured to provide the service of the robot 100. The second modular robot may include a modular robot including a display module (for providing and displaying/outputting information), a modular robot including robot arm(s) (for gripping and (precision) work), a modular robot including an environmental sensor, a modular robot including a space for transporting cargo, food, and the like, and a door that opens and closes, and the like.

The robot 100 may be configured through combination of the first modular robot and the second modular robot. For example, when the robot 100 provides a path guidance service, the first modular robot may be controlled such that the robot 100 may move and the second modular robot may be controlled such that the robot 100 may output appropriate information (map information, path guidance information, etc.), under the control of the robot control system 120. Alternatively, when the robot 100 provides a goods delivery service, the first modular robot may be controlled such that the robot 100 may move to a location of goods and a location of a user at a delivery destination and the second modular robot may be controlled such that the robot 100 may open the door to load goods or to provide the loaded goods to the user at the delivery destination, under the control of the robot control system 120. Alternatively, when the robot 100 provides a service for moving cargo, the first modular robot may be controlled such that the robot 100 may move to a location of the goods and the second modular robot may be controlled such that the robot 100 may control a robot arm to grip the goods, under the control of the robot control system 120.

As described above, each of the plurality of modular robots may be individually controlled by the robot control system 120 without interaction with another robot or another modular robot. Each of the plurality of modular robots including the aforementioned first modular robot and second modular robot may be a brainless robot in terms of being controlled by executing a command from the robot control system 120, without interaction with the other robot or the other modular robot.

In an example embodiment, since the robot 100 may be reconfigured according to a situation through combination of the modular robots, scalability of the robot 100 may be improved and flexibility of use may also be improved. Also, since a modular robot with a failure may be easily replaced, availability of the entire robot 100 may not be compromised and effectiveness of robot maintenance may be improved.

Each of the aforementioned modular robots refers to a device that constitutes the robot 100 and may be configured such that each modular robot does not operate alone (i.e., individually).

Description related to technical features made above with reference to FIG. 1 may apply to FIG. 2 and thus, repeated description is omitted.

A structure and a function of a modular robot that constitutes the robot 100 will be further described with reference to FIG. 4.

Figure 3:
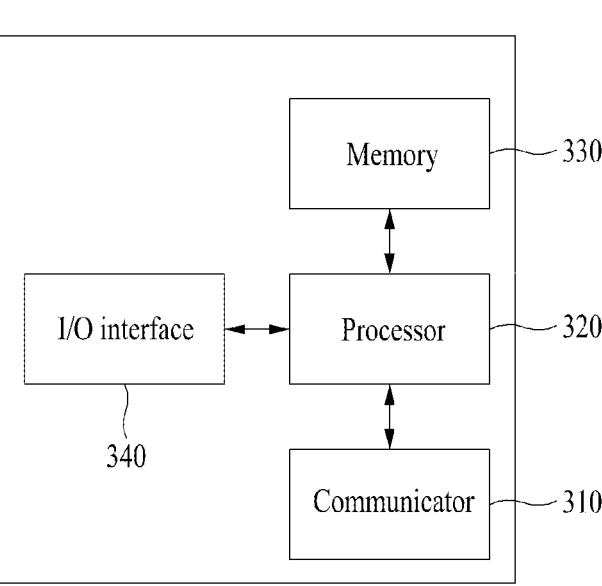
FIG. 3 is a block diagram illustrating a robot control system for controlling a robot configured with a plurality of modular robots according to an example embodiment.

FIG. 3 is a block diagram illustrating a robot control system for controlling a robot configured with a plurality of modular robots according to an example embodiment.

The robot control system 120 may be a device that controls the movement (i.e., driving) of the robot 100 within a space and provision of a service by the robot 100 within the space, which is described above. The robot control system 120 may control movement of each of the plurality of robot 100 and provision of the service by each robot 100. The robot control system 120 may control the robot 100 to perform task(s) required to provide the service through communication with each of modular robots that constitute the robot 100.

For example, the robot 100 may travel through a path in such a manner that the plurality of modular robots is controlled according to a command from the robot control system 120 and may provide the service at a predetermined location or to a predetermined user.

The robot control system 120 may include at least one computing device.

The robot control system 120 may be a device that sets a path for driving of the robot 100 and controls the movement of the robot 100. The robot control system 120 may include at least one computing device and may be implemented as at least one server that is located within the space or outside the space.

As illustrated, the robot control system 120 may include a memory 330, a processor 320, a communicator 310, and an input/output (I/O) interface 340.

The memory 330 may include a permanent mass storage device, such as random access memory (RAM), read only memory (ROM), and disk drive, as computer-readable recording medium. Here, the ROM and the permanent mass storage device may include a permanent storage device separate from the memory 330. Also, an operating system (OS) and at least one program code may be stored in the memory 330. Such software components may be loaded from another computer-readable recording medium separate from the memory 330. The other computer-readable recording medium may include a computer-readable recording medium, such as floppy drive, disk, tape, DVD/CD-ROM drive, and memory card. In another example embodiment, the software components may be loaded to the memory 330 through the communicator 310, rather than the computer-readable recording medium.

The processor 320 may be configured to process a command of a computer program by performing basic arithmetic, logic, and I/O operations. The command may be provided to the processor 320 from the memory 330 or the communicator 310. For example, the processor 320 may be configured to execute a received command according to a program code loaded to the memory 330. The processor 320 may include components (e.g., 410 to 430, etc.) of FIG. 4.

Each of the components (410 to 430, etc.) of the processor 320 may be software and/or hardware modules as a portion of the processor 320 and may represent a function (functional block) implemented by the processor. The components (410 to 430, etc.) of the processor 320 will be further described with reference to FIG. 4.

The communicator 310 may be a component for communication between the robot control system 120 and another device (each modular robot of the robot 100 or another server). That is, the communicator 310 may be a hardware module, such as an antenna, a data bus, a network interface card, a network interface chip, and a networking interface port of the robot control system 120, to transmit/receive data and/or information to/from the other device, or a software module such as a network device driver or a networking program.

The I/O interface 340 may be a device for interfacing with an input device, such as a keyboard or a mouse, and an output device, such as a display or a speaker.

Also, in other example embodiments, the robot control system 120 may include a greater number of components than the number of components illustrated.

The processor 320 may include components for providing a service through autonomous driving of the robot 100. Although not illustrated, the processor 320 may include a map generation module, a localization processing module, a path planning processing module, and a service operation module. In addition to such components, components included in the processor 320 may be representations of different functions performed by at least one processor included in the processor 320 in response to a control command (instruction) according to a code of the OS or a code of at least one program.

The map generation module may be a component for generating an indoor map of a target facility using sensing data generated by a mapping robot (not shown) that autonomously drives within a space for the target facility (e.g., inside the space).

Here, the localization processing module may determine a location of the robot 100 inside the target facility using sensing data received from the robot 100 over a network and the indoor map of the target facility generated through the map generation module.

The path planning processing module may generate a control signal for controlling indoor autonomous driving of the robot 100 using the aforementioned received sensing data and generated indoor map. For example, the path planning processing module may generate a path (i.e., path data) of the robot 100. The generated path (path data) may be set for the robot 100 for driving of the robot 100 that follows the path. The robot control system 120 may transmit information on the generated path to the robot 100 through the network. For example, information on the path may include information indicating the current location of the robot 100, information for mapping the current location and the indoor map, and path planning information. Information on the path may include information on the path through which the robot 100 is to drive to provide the service at a predetermined location or a predetermined user within the space. The path planning processing module may generate the path (i.e., path data) for the robot 100 as the path for driving through at least a portion of an exclusive road 110 designated in the space and may set the path for the robot 100. The robot control system 120 may control the movement of the robot 100 such that the robot 100 may move along the set path (i.e., along the set path).

The aforementioned autonomous driving of the robot 100 may be performed by controlling a corresponding modular robot through communication between the robot control system 120 and the modular robot that provides a function for moving the robot 100.

Also, to control the modular robot that provides the movement function, the robot control system 120 may communicate with another modular robot of the robot 100 that provides sensing information and may also control the modular robot providing the movement function using the sensing information. Therefore, even in this case, from the perspective of the robot 100, autonomous driving of the robot 100 may be controlled in such a manner that brainless modular robots simply execute a command from the robot control system 120, without interaction between the modular robots.

The service operation module of the processor 320 may include a function for controlling a service provided from the robot 100 within the space. For example, the robot control system 120 or a service provider that operates the space may provide an Integrated Development Environment (IDE) for a service (e.g., cloud service) provided from the robot control system 120 to a user or a manufacturer of the robot 100. Here, the user or the manufacturer of the robot 100 may manufacture software for controlling the service provided from the robot 100 within the space through the IDE and may register the same to the robot control system 120. In this case, the service operation module may control the service provided from the robot 100 using the software that is registered in association with the corresponding robot 100. In detail, for example, when it is assumed that the robot 100 provides a service for delivering goods (e.g., food or package) requested by the user to a location of the user, the robot control system 120 may control the robot 100 to move to the location of the corresponding user by controlling indoor autonomous driving of the robot 100. Also, upon arrival at a destination location, the robot control system 120 may transmit a related command to the robot 100 such that the robot 100 provides a series of services for delivering goods to the user and outputting a voice response to the user.

The aforementioned movement for providing the service of the robot 100 may be performed by controlling a corresponding modular robot through communication between the robot control system 120 and the modular robot (e.g., the aforementioned first modular robot) that provides a function for moving the robot 100. Here, to control the modular robot that provides the movement function, the robot control system 120 may communicate with another modular robot (e.g., the aforementioned second modular robot or the following third modular robot) of the robot 100 that collects sensing information and may control the first modular robot using the sensing information.

Further, a task (delivery, pick-up, door opening, etc.) for provision of the service may be performed by controlling a corresponding modular robot through communication between the robot control system 120 and the modular robot (e.g., the aforementioned second modular robot) that provides the corresponding function.

A structure and a function of the modular robot that constitutes the robot 100 and a structure and a function of the robot control system 120 will be further described with reference to the following FIGS. 4 to 11.

Figure 4:
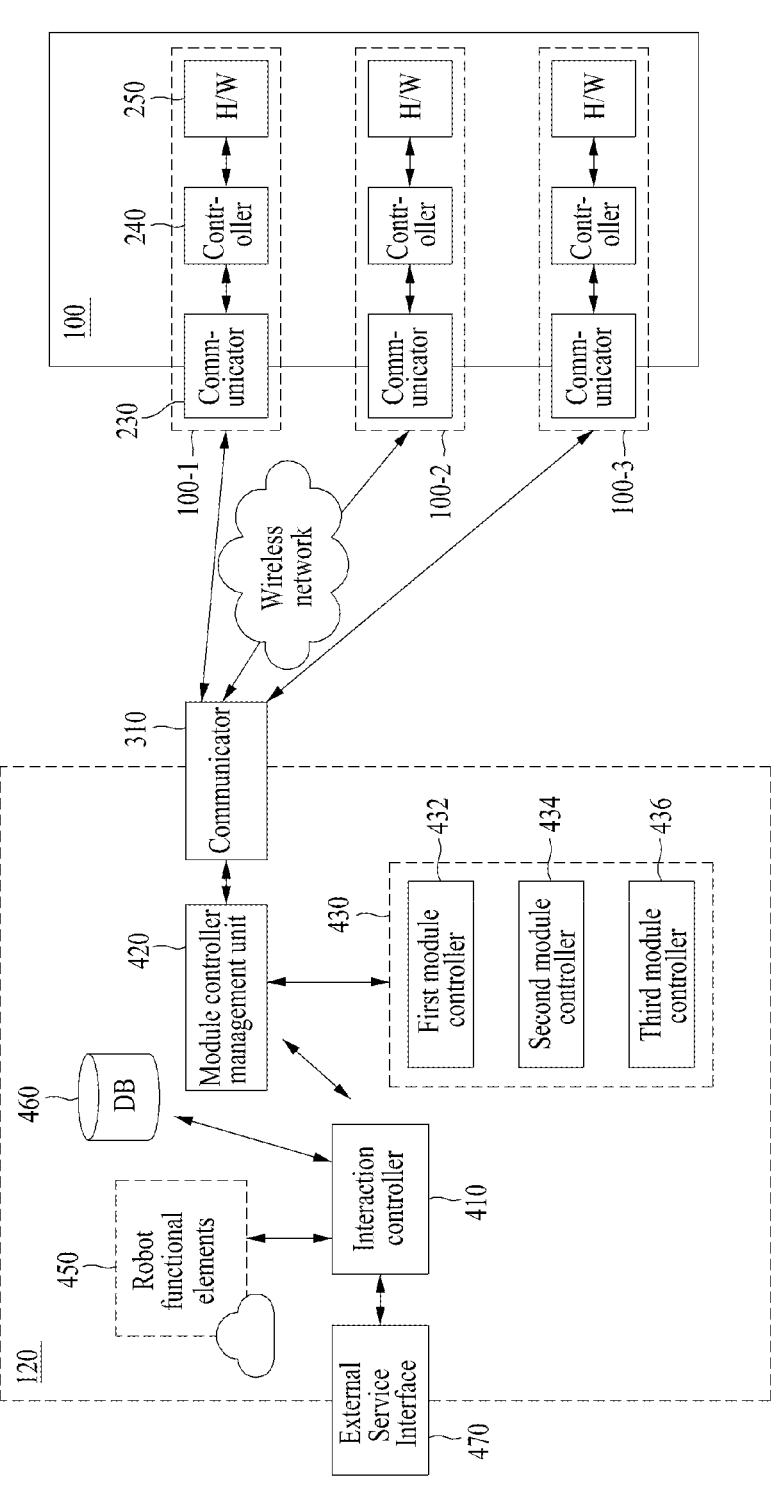
FIG. 4 is a diagram for illustrating a method of individually controlling, by a robot control system, each of a plurality of modular robots constituting a robot according to an example embodiment.

FIG. 4 illustrates a method of individually controlling, by a robot control system, each of a plurality of modular robots that constitutes a robot according to an example embodiment.

Referring to FIG. 4, the robot control system 120 may include an interaction controller 410, a module controller management unit 420, and a module controller 430. 410 to 430 may be the aforementioned components of the processor 320.

The module controller 430 may include module controllers 432, 434, and 436 (432 to 436) for controlling each of the modular robots 100-1 to 100-3 that constitute the robot 100. The module controllers 432 to 436 may correspond to the modular robots 100-1 to 100-3 on a one-to-one basis.

The module controller management unit 420 may be a configuration that manages control of the modular robots 100-1 to 100-3 through the module controllers 432 to 436. The module controller management unit 420 may manage the module controllers 432 to 436 and, if it is necessary for control of the robot 100, may dynamically generate an additional module controller. Each of the module controllers 432 to 436 may be configured by instantiating a control line for each of the modular robots 100-1 to 100-3.

The interaction controller 410 may be a configuration for processing an interacting function among the modular robots 100-1 to 100-3. The interaction controller 410 may be a configuration for controlling the robot 100 at a higher level than the module controllers 432 to 436. For example, the interaction controller 410 may be configured to provide an abstraction level of control command for each modular robot based on information on the modular robots 100-1 to 100-3 of the robot 100, and setting information and specification information on the modular robots 100-1 to 100-3. The interaction controller 410 may control the modular robots 100-1 to 100-3 through the module controllers 432 to 436 by transmitting the abstraction level of control command to the module controllers 432 to 436.

Alternatively, although not illustrated, the interaction controller 410 may be configured to directly communicate with the modular robots 100-1 to 100-3, and, here, the interaction controller 410 may be configured to simultaneously serve as the module controllers 432 to 436 and the module controller management unit 420.

The robot control system 120 may include an external service interface 470 as a component for receiving a request of a task, e.g., from a user's service terminal or service provider's terminal, related to the requested service through the external service interface 470. Although not illustrated, the external service interface 470 may be configured as a portion of the communicator 310.

The interaction controller 410 may receive a request for the task (or mission) related to the requested service through the external service interface 470, may interpret the request, and may control each of the modular robots 100-1 to 100-3. The request may be processed into the control command for controlling the robots.

When controlling the modular robots 100-1 to 100-3, the interaction controller 410 may use predefined robot functional elements 450. The interaction controller 410 may use, for example, predefined robot functional elements 450 to control functions of measurement, path planning, and recognition (through a sensor) of the modular robots 100-1 to 100-3. The robot functional elements 450 may be provided inside or outside (external server or cloud) the robot control system 120 and configured as hardware and/or software modules.

Also, the interaction controller 410 may manage a database (DB) 460 that stores state information and/or sensing information from the modular robots 100-1 to 100-3 and interaction information of the modular robots 100-1 to 100-3. The DB 460 may be provided inside or outside (external server or cloud) the robot control system 120. The interaction controller 410 may store information collected from the modular robots 100-1 to 100-3 in the DB 460 and may reference the information from the DB 460 to use the same for control of the modular robots 100-1 to 100-3.

The communicator 310 may provide an endpoint for connection between each of the modular robots 100-1 to 100-3 of the robot 100 and the robot control system 120. Each of the module controllers 432 to 436 may communicate with the modular robots 100-1 to 100-3 directly or via the module controller management unit 420, through the communicator 310.

According to the aforementioned configuration of the robot control system 120, the robot control system 120 may be a brain system for the brainless robot 100 (brainless modular robots 100-1 to 100-3). The module controllers 432 to 436 may be the brain of all levels for the modular robots 100-1 to 100-3.

Although not illustrated, each of the interaction controller 410, the module controller management unit 420, and the module controllers 432 to 436 may be implemented as a server.

Hereinafter, the robot 100 configured with the modular robots 100-1 to 100-3 will be further described.

As described above, the robot 100 may be a service robot used to provide a service within a space. The robot 100 may provide the service at a predetermined location or to a predetermined user within the space through autonomous driving.

The robot 100 may be a physical device and, as illustrated, may include the plurality of modular robots 100-1 to 100-3.

Each of the plurality of modular robots 100-1 to 100-3 may be a brainless robot in that it is controlled by executing a command from the robot control system 120, without interaction with another robot or another modular robot. Each of the plurality of modular robots 100-1 to 100-3 may be configured to perform a function for performing a task related to a requested service.

Each of the plurality of modular robots 100-1 to 100-3 may include a communicator 230, a controller 240, and hardware (H/W) 250.

The controller 240 may be a physical processor built in the robot 100. The processor 240 may include non-illustrated components and such components may be representations of different functions performed by at least one processor included in the processor 240 in response to a control command (instruction) according to a code of an OS or a code of at least one computer program.

The controller 240 may be configured to have only a level of brain required by the modular robot 100-1 as a brainless robot. The controller 240 may be configured to control the H/W 250 by executing a command from the robot control system 120 (e.g., the first remote module controller 432). The controller 240 does not include a component for communication and interaction with the plurality of other modular robots 100-2 and 100-3.

The communicator 230 may be a component for communication between the modular robot 100-1 and the robot control system 120. That is, the communicator 230 may be a hardware module, such as an antenna, a data bus, a network interface card, a network interface chip, and a networking interface port of the modular robot 100-1, to transmit/receive data and/or information to/from the robot control system 120, or a software module, such as a network device driver or a networking program.

The H/W 250 may be a physical component for executing a function of the modular robot 100-1. For example, as a configuration that controls the movement of the robot 100 and enables the robot 100 to move, the H/W 250 may include a driving unit (wheels, legs, caterpillar wheels, etc.) that includes equipment for performing the same.

Alternatively/additionally, the H/W 250 may include a sensor unit as a configuration for collecting data required for autonomous driving and service provision of the robot 100. The sensor unit may not include expensive sensing equipment and may include a sensor, such as an inexpensive ultrasound sensor and/or inexpensive camera. Also, the sensor unit may include a sensor for identifying another robot or a human in front and/or behind. For example, another robot, a human, and other features may be identified through a camera of the sensor unit. Alternatively, the sensor unit may include an infrared (IR) sensor (or (IR) camera). The sensor unit may further include a sensor for recognizing/identifying a nearby user, another robot, features in addition to the camera.

Alternatively/additionally, the H/W 250 may further include equipment related to a service provided from the robot 100. For example, as a configuration for performing a food/goods delivery service, the H/W 250 may include a loader for loading food/goods to be delivered, a door that may be opened/closed under the control of the robot control system 120, a configuration (e.g., robot arm) for delivering food/goods to a user. Alternatively/additionally, the H/W 250 may further include a speaker and/or display for providing information/contents related to providing the requested service.

Sensing information collected by the H/W 250 as well as the sensor unit and/or state information of the modular robot 100-1 may be transmitted to the robot control system 120 and used for control of the modular robots 100-1 to 100-3. Therefore, control of the robot 100 including the modular robots 100-1 to 100-3 may be effectively performed even without direct interaction among the modular robots 100-1 to 100-3.

For example, the controller 240 may transmit sensing information by a sensor unit to the robot control system 120 through the communicator 230. The robot control system 120 may transmit, to the modular robot 100-1, a movement command based on path data generated using an indoor map within the space. In response to the received movement command, the modular robot 100-1 may control a driving unit included in the H/W 250 to move the robot 100.

Similar technical description made in relation to the modular robot 100-1 may apply to the modular robot 100-2 or 100-3 and thus, repeated description is omitted.

As in the illustrated example, the first remote module controller 432 and the modular robot 100-1 may make a one-to-one correspondence. The controller 240 may correspond to a configuration of directly controlling the H/W 250 and control of the H/W 250 at a logical level may be remotely performed through the robot control system 120.

As described above, through an example embodiment, it is possible to perform individual distributed control for each of the modular robots 100-1 to 100-3 corresponding to a brainless robot. The modular robots 100-1 to 100-3 do not interwork with each other and do not have interdependency.

The robot 100 may have a size and a shape according to the types or the sizes of the modular robots that constitute the robot 100. That is, the robot 100 may be configured to include different modular robots according to the type of a service desired to provide. In an example embodiment, since various robots may be efficiently controlled through individual distributed control for modular robots, scalability of the robot 100 may be improved.

Description related to technical features made above with reference to FIGS. 1 to 3 may apply as is to FIG. 4 and thus, repeated description is omitted.

In the following description, an operation performed by components of the robot control system 120, the robot 100, or the modular robots 100-1, 100-2, 100-3 may be described as an operation performed by the robot control system 120, the robot 100, or the modular robots for description of convenience.

Figure 5:
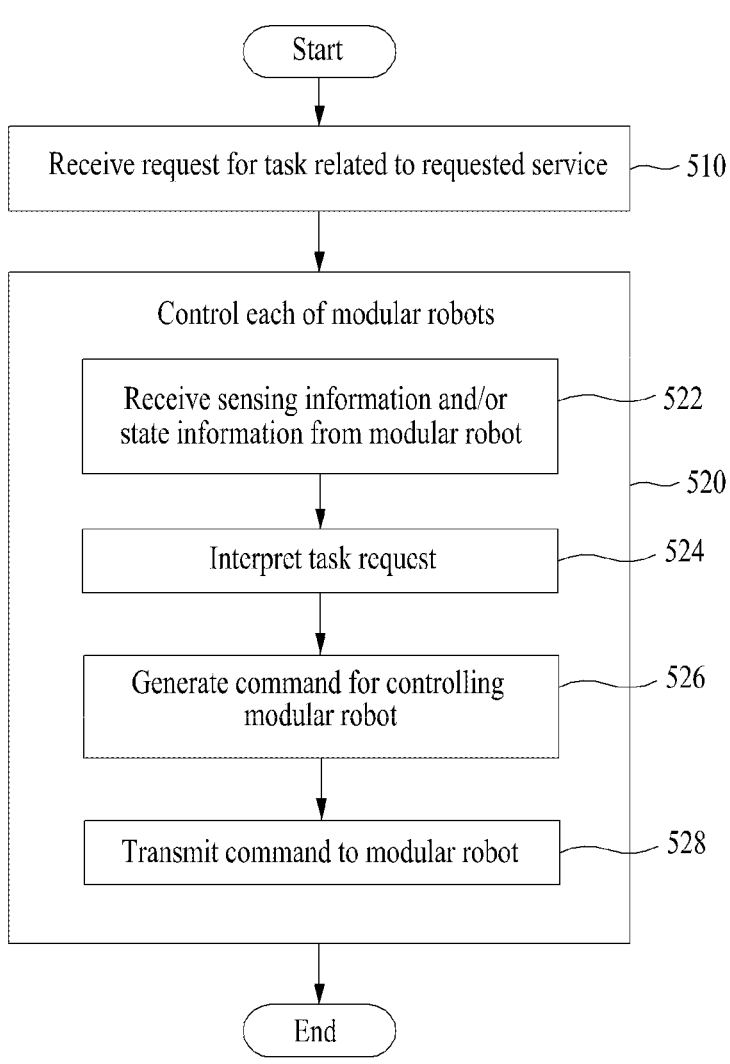
FIG. 5 is a flowchart illustrating a method of controlling a robot configured with a plurality of modular robots according to an example embodiment.

FIG. 5 is a flowchart illustrating a method of controlling a robot configured with a plurality of modular robots according to an example embodiment.

A method of controlling the robot 100 configured with the plurality of modular robots 100-1 to 100-3, performed by the robot control system 120 will be further described with reference to FIG. 5.

In operation 510, the robot control system 120 may receive a request for a task related to a service requested for the robot 100 (e.g., through the external service interface 470). The request of the service may be received from a user (or a terminal of the user) within a space or may be received from a manager (or a terminal of the manager) that manages the service in response to a request from the user. The request of the service may include a request of the task related to the service. For example, when a path guidance service is requested, a task of providing a path guidance to a specific target (user) may be requested for the robot control system 120. Alternatively, when a goods delivery service is requested, a task of providing pick-up of specific goods and/or delivery of picked-up goods may be requested for the robot control system 120.

In operation 522, the robot control system 120 may receive first sensing information and/or first state information from the first modular robot 100-1 that performs a first function among the plurality of modular robots 100-1 to 100-3 (e.g., through the communicator 310). Alternatively/additionally, the robot control system 120 may receive second sensing information and/or second state information from the second modular robot 100-2 that performs a second function among the plurality of modular robots 100-1 to 100-3.

The first function performed by the first modular robot 100-1 may relate to moving the robot 100. Here, the first modular robot 100-1 may be a mobile base modular robot configured to move the robot 100. For example, the first modular robot 100-1 may include a modular robot for walking of the robot 100 or a modular robot for driving using wheels or caterpillar wheels of the robot 100.

The second function performed by the second modular robot 100-2 may relate to a function for providing the requested service, and the second modular robot 100-2 may be a service modular robot configured to provide the service of the robot 100. The second modular robot 100-2 may include a modular robot including a display module (for providing and displaying/outputting information), a modular robot including robot arm(s) (for gripping and (precision) work), a modular robot including an environmental sensor, a modular robot including a space for transporting cargo, food, and the like, and a door that opens and closes, and the like.

The first sensing information may be sensing information collected from the H/W 250 of the first modular robot 100-1 and the first state information may be state information of the robot 100-1 obtained (monitored) through the H/W 250. The first sensing information may include sensing data related to the environment within a space in which the first modular robot 100-1 is located. Similar description may also apply to second sensing information and second state information and thus, repeated description is omitted.

Reception of the first sensing information and/or the first state information in operation 522 may be included in controlling the first modular robot 100-1 in operation 520. Although not illustrated, operation 522 may be separate from operation 520.

In operation 520, the robot control system 120 may control the first modular robot 100-1 based on the received first sensing information and/or first state information. Alternatively/additionally, the robot control system 120 may control the second modular robot 100-2 based on the second sensing information or the second state information. The robot control system 120 may control the first modular robot 100-1 by transmitting a first command to the first modular robot 100-1, and may control the second modular robot 100-2 by transmitting a second command to the second modular robot 100-2.

Therefore, in an example embodiment, without interaction between the first modular robot 100-1 and the second modular robot 100-2, each of the first modular robot 100-1 and the second modular robot 100-2 may be individually controlled by the robot control system 120 and accordingly, the robot 100 may be controlled to perform the task related to the service requested for the robot 100.

In detail, as in operation 524, the robot control system 120 may interpret the request of the task received in operation 510.

In operation 526, the robot control system 120 may generate the first command for controlling the first modular robot 100-1 based on a result of interpreting the request and the first sensing information and/or the first state information from the first modular robot 100-1. Also, the robot control system 120 may generate the second command for controlling the second modular robot 100-2 based on the result of interpreting the request and the second sensing information and/or the second state information from the second modular robot 100-2.

When generating the first command, the robot control system 120 may generate the first command using information obtained from a predefined first functional element in association with the first function. Also, when generating the second command, the robot control system 120 may generate the second command using information obtained from a predefined second functional element in association with the second function.

As described above, the functional elements 450 related to the functions provided from the modular robots 100-1 to 100-3 may be predefined. The robot control system 120 may generate a command for controlling the modular robots 100-1 to 100-3 using information received from the modular robots 100-1 to 100-3 and the predefined functional elements 450. Each of the functional elements 450 may include a dataset and/or a function used to generate the command for controlling each of the modular robots 100-1 to 100-3.

When generating the second command, the robot control system 120 may generate the second command for controlling the second modular robot 100-2 by further using the first sensing information or the first state information from the first modular robot 100-1. Therefore, the second modular robot 100-2 may be controlled in response to the second command generated by further using the first sensing information or the first state information.

That is, when controlling a single modular robot, sensing information/state information received from a corresponding modular robot may be used, but sensing information/state information received from another corresponding modular robot may be further used. Therefore, although direct interaction (and linkage) may not be performed between brainless modular robots, the robot control system 120 may enable substantial linkage between the brainless modular robots.

For example, when the requested service is a path guidance service, the robot control system 120 may be requested a task of moving the robot 100 along a path and outputting a message/notice (suitable for a location). Here, the robot control system 120 (e.g., interaction controller 310) may interpret the request of the task and may classify the task (mission) into detailed tasks (sub-tasks/missions). The detailed task may include i) moving the robot 100, ii) displaying a map while moving the robot 100, and iii) displaying a message upon arrival at a specific location.

For performing each of tasks i) to iii), the robot control system 120 may analyze information received from the plurality of modular robots 100-1 to 100-3, may generate a command to be transmitted to each of the modular robots 100-1 to 100-3, and may transmit the generated command to each of the modular robots 100-1 to 100-3.

For example, when it is assumed that the first modular robot 100-1 is a robot for movement of the robot 100, the second modular robot 100-2 is a robot for positioning of the robot 100, and the third modular robot 100-3 is a robot for display of information, the robot control system 120 may generate a command for controlling the first modular robot 100-1 based on positioning information received from the second modular robot 100-2 and state information received from the first modular robot 100-1 and accordingly, may move the first modular robot 100-1 to a target location. Also, the robot control system 120 may generate a command for controlling the second modular robot 100-2 based on positioning information received from the second modular robot 100-2 and state information received from the first modular robot 100-1. Therefore, the robot control system 120 may control the second modular robot 100-2 to continuously perform positioning. Also, the robot control system 120 may generate a command for controlling the third modular robot 100-3 based on positioning information received from the second modular robot 100-2 and state information received from the third modular robot 100-3 and accordingly, may control the third modular robot 100-3 to display map information and to output a guidance message upon arrival at the target location.

Therefore, information collected from the modular robot 100-2 for positioning may be used to control the modular robot 100-1 for movement and the modular robot 100-3 for display of information. Here, interaction may be absent between the modular robot 100-2 and the modular robot 100-1 and the modular robot 100-3 and processing of such an interaction function may be performed only within the robot control system 120 (interaction controller 410).

Through an example embodiment, although the modular robots 100-1 to 100-3 constituting the robot 100, including the first modular robot 100-1 and the second modular robot 100-2 are individually distributed and controlled, the modular robots 100-1 to 100-3 may be practically connected to process a task related to a service requested for the robot 100.

An example of controlling the robot 100 including the plurality of modular robots through the robot control system 120 will be further described with reference to FIG. 9.

Figure 9:
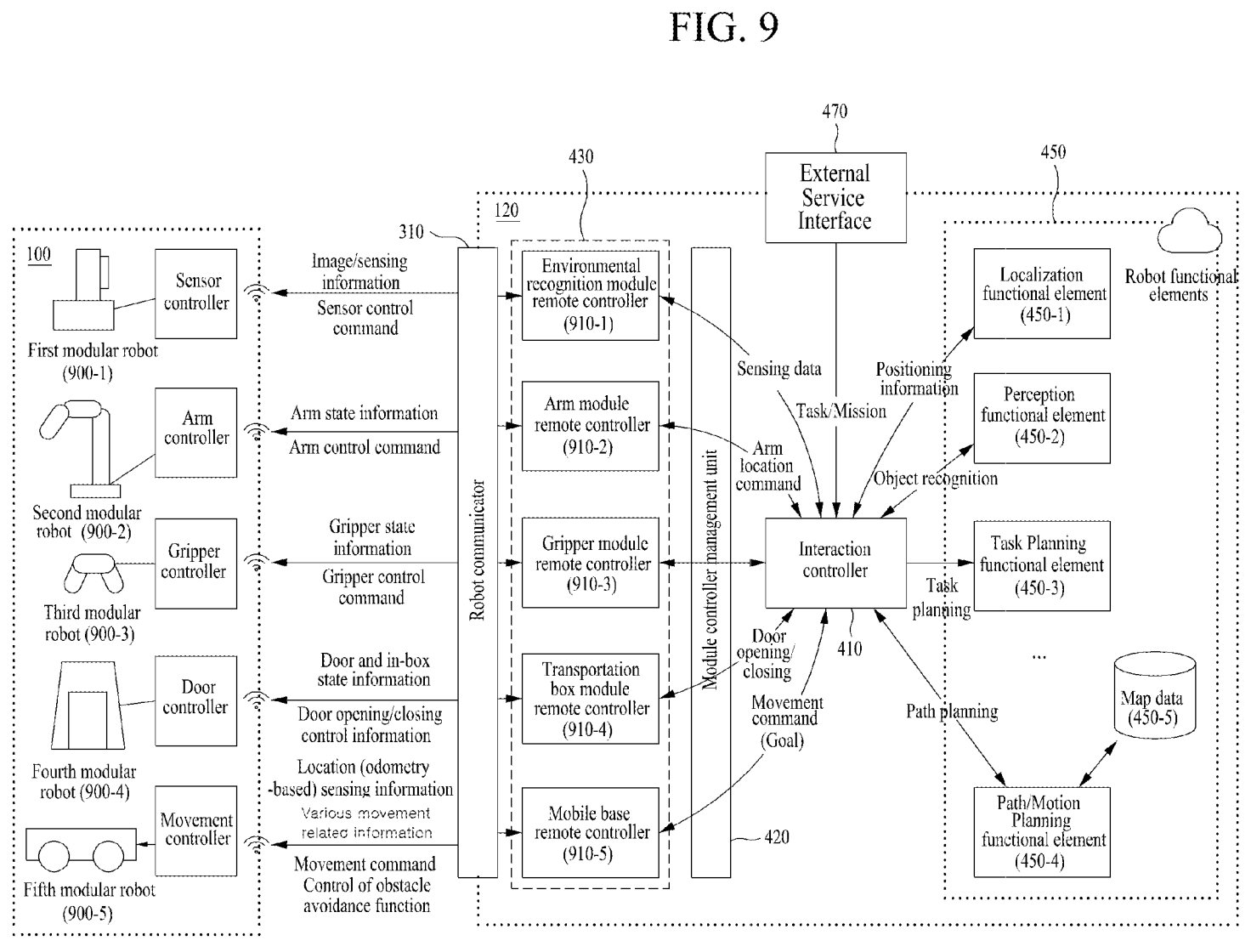

FIG. 9 illustrates a method of individually controlling, by a robot control system, each of a plurality of modular robots constituting a robot according to an example.

Referring to FIG. 9, the robot 100 is configured by first to fifth modular robots 900-1, 900-2, 900-3, 900-4, and 900-5 (900-1 to 900-5). The robot 100 may be configured through combination of the first modular robot to the fifth modular robot 900-1 to 900-5.

As illustrated, the first modular robot to the fifth modular robot 900-1 to 900-5 may correspond to module controllers 910-1, 910-2, 910-3, 910-4, and 910-5 (910-1 to 910-5) on a one-to-one basis and may be controlled by the module controllers 910-1 to 910-5 (lower-level data and control).

As illustrated, the interaction controller 410 may receive a request for a task/mission related to a service through the external service interface 470. The interaction controller 410 may interpret the received request, may generate a command for controlling the first modular robot to the fifth modular robot 900-1 to 900-5 based on the result of interpreting and information received from the first modular robot to the fifth modular robot 900-1 to 900-5, and may transmit the generated command to the first modular robot to the fifth modular robot 900-1 to 900-5 to control the first modular robot to the fifth modular robot 900-1 to 900-5.

In detail, through the communicator 310, the robot control system 120 may receive an image and/or sensing information from the first modular robot 900-1 configured to sense environmental information, may receive robot arm state information from the second modular robot 900-2 configured to operate a robot arm, may receive gripper state information from the third modular robot 900-3 configured to operate a gripper, may receive door state information from the fourth modular robot 900-4 configured to open/close a door, and may receive movement-related sensing information and/or movement-related state information from the fifth modular robot 900-5 configured to perform movement.

The interaction controller 410 may transmit a command for controlling the module controllers 910-1 to 910-5 to the modular robots 900-1 to 900-5 based on information received from the modular robots 900-1 to 900-5 and a result of interpreting the requested task.

When generating a command for controlling the modular robots 900-1 to 900-5, the interaction controller 410 may use the predefined robot functional elements 450. That is, the robot control system 120 may generate a command for controlling the modular robots 900-1 to 900-5 using information received from the modular robots 900-1 to 900-5 and the predefined functional elements 450, according to the result of interpreting the requested task. Each of the functional elements 450 may include a dataset (DB) and/or function (stateless function) used to generate a command for controlling each of the modular robots 900-1 to 900-5. For example, the robot functional elements 450 may include a localization functional element 450-1 for a positioning function of the robot 100, a recognition functional element 450-2 for an object recognition function of the robot 100, a task planning functional element 450-3 for establishing task planning of the robot 100, and a path/motion planning functional element 450-4 for establishing path planning of the robot 100. The path/motion planning functional element 450-4 may be configured to include or refer to map data 450-5.

The interaction controller 410 may generate a command for controlling the modular robots 900-1 to 900-5 based on information received from the predefined robot functional elements 450 and the modular robots 900-1 to 900-5 and may transmit the generated command to the module controllers 910-1 to 910-5. For example, the interaction controller 410 may transmit a command for recognizing and grasping a posture of an object to the first modular robot 900-1 such that the first modular robot 900-1 may be controlled according to sensor control; may transmit a robot arm control command to the second modular robot 900-2 such that a robot arm of the second modular robot 900-2 may be controlled; may transmit a gripper control command to the third modular robot 900-3 such that a gripper of the third modular robot 900-3 may be controlled; may transmit a door control command to the fourth modular robot 900-4 such that a door of the fourth modular robot 900-4 may be opened or closed; and may transmit a movement command to the fifth modular robot 900-5 such that the fifth modular robot 900-5 may move or avoid an obstacle.

For example, when the requested task is a task of loading an object to the robot 100, the robot 100 may be controlled to move to a destination (service provision location) (control of the fifth modular robot 900-5), to recognize the object and grasp a location and a posture of the object (control of the first modular robot 900-1), to move the robot arm with respect to the object and to grip the object through the gripper and then open the door, to load the object to a loading portion of the robot 100, and to close the door again (control of the second to the fourth modular robots 900-2 to 900-4).

Therefore, in reality, simply, the robot control system 120 individually controls each of the modular robots 900-1 to 900-5 and each of the modular robots 900-1 to 900-5 executes a command from the robot control system 120, but the robot 100 may complete the requested task by being controlled as if the modular robots 900-1 to 900-5 operate in conjunction with each other.

In accordance with one embodiment, the module controller 430 may directly control at least one of the modular robots 900-1 to 900-5 without intervention of the interaction controller 910 according to the type of a controlled function of the modular robots 900-1 to 900-5. Here, the module controller 430 may generate a command for controlling at least one of the modular robots 900-1 to 900-5 through direct access to the predefined functional elements 450.

Description related to technical features made above with reference to FIGS. 1 to 4 may apply as is to FIGS. 5 and 9 and thus, repeated description is omitted.

FIG. 6 is a flowchart illustrating a method of generating a module controller for controlling each of modular robots and controlling each modular robot according to an example.

The module controllers 432 to 436 and 910-1 to 910-5 described above with reference to FIGS. 4 and 9 may be components dynamically generated by the robot control system 120.

In operation 610, the robot control system 120 (e.g., module controller management unit 420) may configure (e.g., dynamically generate) the first module controller 432 for controlling the first modular robot 100-1 and the second module controller 434 for controlling the second modular robot 100-2. When control of the third modular robot 100-3 that performs a third function among the plurality of modular robots 100-1 to 100-3 is required to perform the requested task, the robot control system 120 may configure (e.g., dynamically generate) the third module controller 436 for controlling the third modular robot 100-3. For example, when it is determined that additional control of the modular robot 100-3 is required as a result of interpreting the request for the task, the robot control system 120 may generate the module controller 436 for controlling the corresponding modular robot 100-3.

Each of the module controllers 432 to 436 may be configured by instantiating a control line for each of the modular robots 100-1 to 100-3. They may be configured as software modules, and configured variously in response to the circumstances (e.g., depending on the interpretation of the request for the task).

A module controller for controlling an unnecessary modular robot may be removed when performing the requested task.

In operation 620, the robot control system 120 may control the modular robots 100-1 to 100-3 through the configured module controllers 432 to 436.

The robot control system 120 may receive first sensing information and/or first state information from the first modular robot 100-1 and may transmit the generated first command to the first modular robot 100-1 using the first module controller 432 corresponding to the first modular robot 100-1. Also, the robot control system 120 may receive second sensing information or second state information from the second modular robot 100-2 and may transmit the generated second command to the second modular robot 100-2 using the second module controller 434 corresponding to the second modular robot 100-2. Also, the third modular robot 100-3 may be controlled in a similar manner.

The first module controller to the third module controller 432 to 436 may correspond to the first modular robot to the third modular robot 100-1 to 100-3, respectively, on a one-to-one basis.

As described above, in an example embodiment, a controller for controlling each of modular robots that constitute the robot 100 may be dynamically generated and removed according to a configuration of the robot 100 or a service provided from the robot 100.

The module controllers 432 to 436 may be components of the processor 320.

Description related to technical features made above with reference to FIGS. 1 to 5 and 9 may apply as is to FIG. 6 and thus, repeated description is omitted.

FIG. 7 is a flowchart illustrating a method of controlling a plurality of robots by individually controlling modular robots included in each robot according to an example.

In the following, a method of controlling a plurality of robots (multiple robots) each configured with a plurality of modular robots using the robot control system 120 will be further described.

The robot control system 120 may be configured to further control another robot configured with a plurality of other modular robots in addition to the robot 100. The robot control system 120 may individually control each of the corresponding plurality of other modular robots without interaction between the plurality of other modular robots that constitutes the other robot. Therefore, the other robot may be controlled to perform another task related to a service requested for the corresponding other robot.

That is, the robot control system 120 may be implemented as a multi-robot brain system that controls the plurality of robots each configured with the modular robots.

In the following, a method of implementing the robot control system 120 as the multi-robot brain system will be further described.

Figure 10:
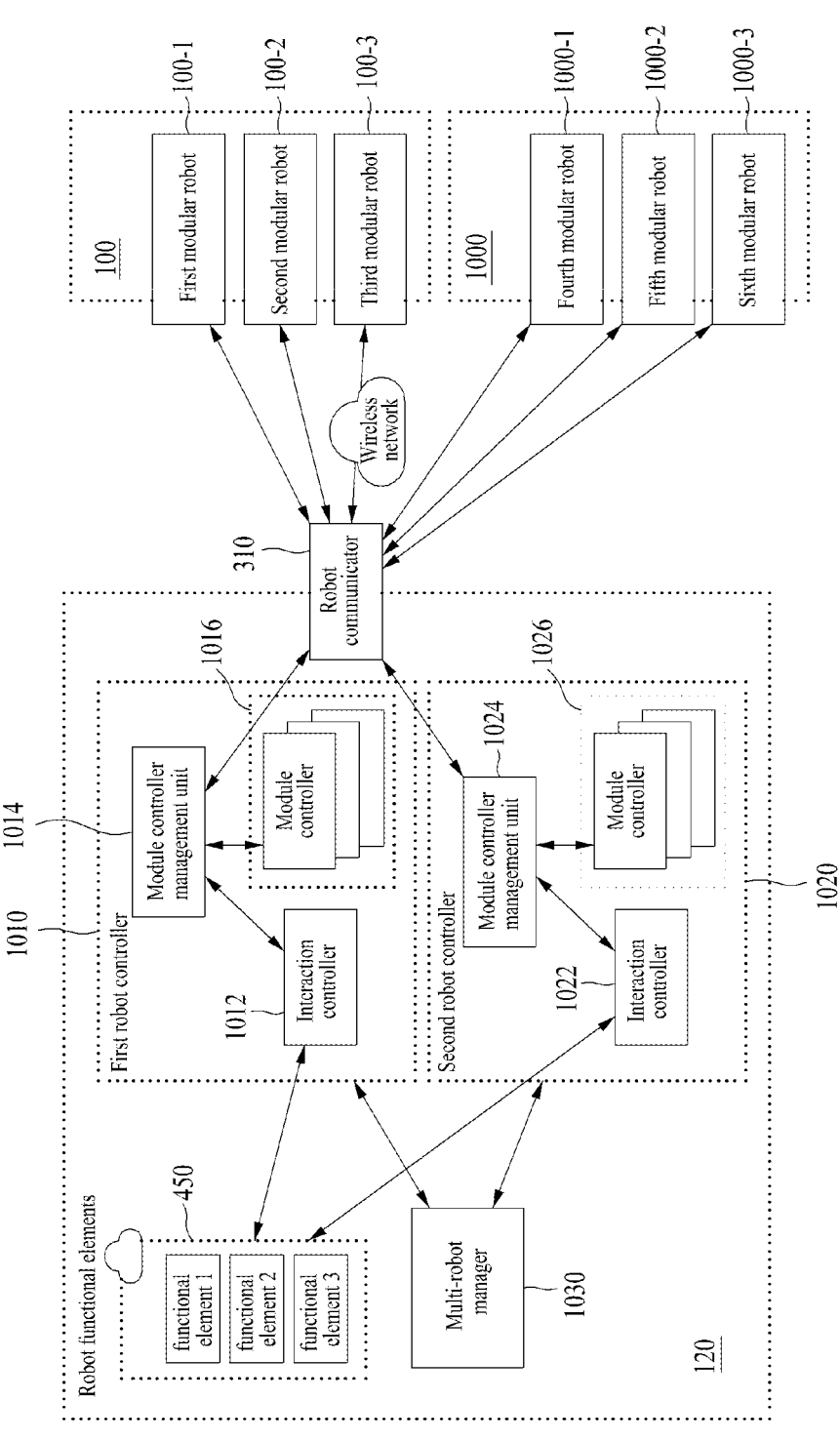
FIGS. 10 and 11 are diagrams for illustrating a method of controlling a plurality of robots by individually controlling modular robots included in each robot according to an example.
Figure 11:
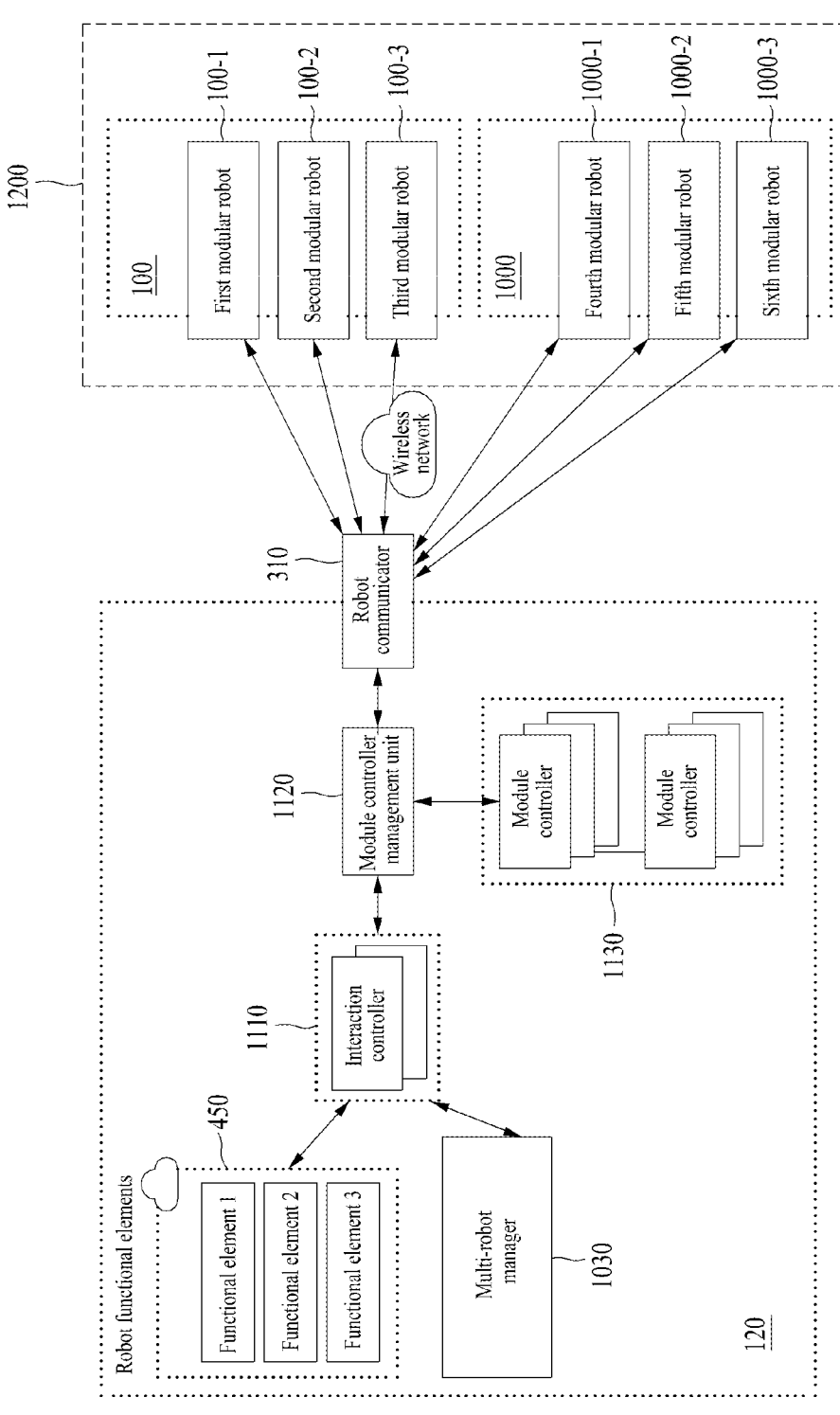

In this regard, FIGS. 10 and 11 illustrate a method of controlling a plurality of robots by individually controlling modular robots included in each robot according to an example.

In operation 710, the robot control system 120 (processor 320) may configure (generate) a robot controller for controlling each of a plurality of robots (robots including the robot 100 and the other robot).

In operation 720, the robot control system 120 may individually control each of modular robots included in each robot.

Therefore, as in operation 730, the robot control system 120 may individually control each robot to perform a task (related to a service) or may control at least two robots to operate in conjunction with each other.

For example, each of the robot configured with the plurality of modular robots and the other robot configured with the plurality of other modular robots may be controlled by a robot controller independently configured (configured as a component of the processor 320) in the robot control system 120.

That is, referring to FIG. 10, the robot control system 120 (processor 320) may include a first robot controller 1010 configured to control the robot 100 and a second robot controller 1020 configured to control the other robot 1000. The first robot controller 1010 and the second robot controller 1020 may be configured to be independent with respect to each other. That is, the first robot controller 1010 and the second robot controller 1020 may be configured to mutually independently control the robot 100 and the other robot 1000 as independent robot brains for the robot 100 and the other robot 1000, respectively.

The robot controller may be dynamically generated according to the number of robots controlled by the robot control system 120. Therefore, the robot brain may be flexibly scaled according to the number of robots being controlled.

The robot controllers 1010 and 1020 may include module controller management units 1014 and 1024, interaction controllers 1012 and 1022, and module controllers 1016 and 1026, respectively. Description related to the module controller management unit 420, the interaction controller 410, and the module controller 430 made above with reference to FIG. 4 may apply similarly to a configuration of the robot controllers 1010 and 1020 and thus, repeated description is omitted.

Each of the modular robots 100-1 to 100-3 that constitute the robot 100 and modular robots 1000-1, 1000-2, and 1000-3 (1000-1 to 1000-3) that constitute the other robot 1000 may be individually controlled by the robot controller 1010, 1020. Linkage between the robot 100 and the other robot 1000 may be managed by a multi-robot manager 1030 included in the robot control system 120. Therefore, the robot control system 120 may be implemented as a multi-robot brain system for controlling independently operating robots.

In another example embodiment and referring to FIG. 11, the robot 100 and the other robot 1000 may be controlled to operate in conjunction with each other and operate as if the robot 100 and the other robot 1000 are a single virtual robot 1200 (two robots in reality). That is, the robot 100 and the other robot 1000 may configure a single virtual robot 1200.

Here, each of the robot 100 and the other robot 1000 may be controlled by a common robot controller of the robot control system 120 (processor 320) (i.e., robot controller configured with an interaction controller 1110, a module controller management unit 1120, and a module controller 1230).

In such an example embodiment, for example, a task performed by the robot 100 and another task performed by the other robot 1000 may be interrelated tasks and the robot 100 and the other robot 1000 may be controlled to operate in conjunction with each other. For example, when the robot 100 refers to a robot including a robot arm and moves an object gripping the object and the other robot 1000 refers to a robot including a carrier and loads an object, the robot 100 and the other robot 1000 may cooperate with each other and may be controlled to load the object gripped by the robot arm of the robot 100 to the other robot 1000 under the control of the robot control system 120.

The interaction controller 1110 may be a robot cooperation/coordination brain. That is, a unit of the interaction controller 1110 may be implemented differently from a unit of a physical robot. In other words, each of the interaction controller 1110 may not necessarily correspond to each of the physical robot and may be associated with a plurality of robots.

As described, each of the module controllers 1130 may be dynamically scaled.

In an example embodiment, although there are two visible robots that are actually controlled, the modular robots 100-1 to 3 and 1000-1 to 3 included in the two robots 100 and 1000 may be individually controlled and accordingly, interaction between the robots 100 and 1000 may increase and the robots 100 and 1000 may operate as if the robots 100 and 1000 are a single virtual robot 1200. The multi-robot manager 1030 may be a component configured to manage linkage between a plurality of virtual robots, when the plurality of virtual robots each configured with such robots is present.

Therefore, the robot control system 120 may be implemented as a multi-robot brain system for controlling robots that independently operate in conjunction with each other.

As described above, in an example embodiment, by adding a layer corresponding to a module controller within the robot control system 120, it is possible to variably set a boundary of a conceptual robot (robot including a plurality of modular robots) and to variously configure a multi-robot system for controlling the robots.

Referring to FIG. 10, in an example embodiment, a remote brain (robot controller) for allowing the module controllers to interact may be configured based on a single robot unit and the multi-robot manager 1030 for interaction between remote brains may be added as a component of the robot control system 120.

Also, referring to FIG. 11, the robot control system 120 may be implemented to not limit the interaction controller 1110 for allowing the module controllers to interact to a single robot while maintaining the entire module controllers 1130 within a single subsystem. In this case, the plurality of robots may be regarded as a single large robot (virtual robot) including a large number of modular robots and thereby controlled.

For example, when four robots are assumed to carry a single object together, the robots may be classified by 4 based on base modular robots of a corresponding robot. The four robots may be controlled through (four) layers that control interaction between modular robots of each robot and a multi-robot layer (multi-robot manager 1030) that controls interaction among the four robots (see FIG. 10).

Alternatively, the four robots may be assumed as a single virtual robot (or robot group) having four base modular robots. Here, the virtual robot (configured with four robots) may be controlled through (one) layer that controls interaction between all modular robots included in the corresponding virtual robot and a multi-robot layer (multi-robot manager 1030) controls interaction between a plurality of virtual robots when the plurality of virtual robots each (virtual group) configured based on a unit of four is present (see FIG. 11).

Description related to technical features made above with reference to FIGS. 1 to 6 and FIG. 9 may apply as is to FIGS. 7, 10, and 11 and thus, repeated description is omitted.

Figure 8:
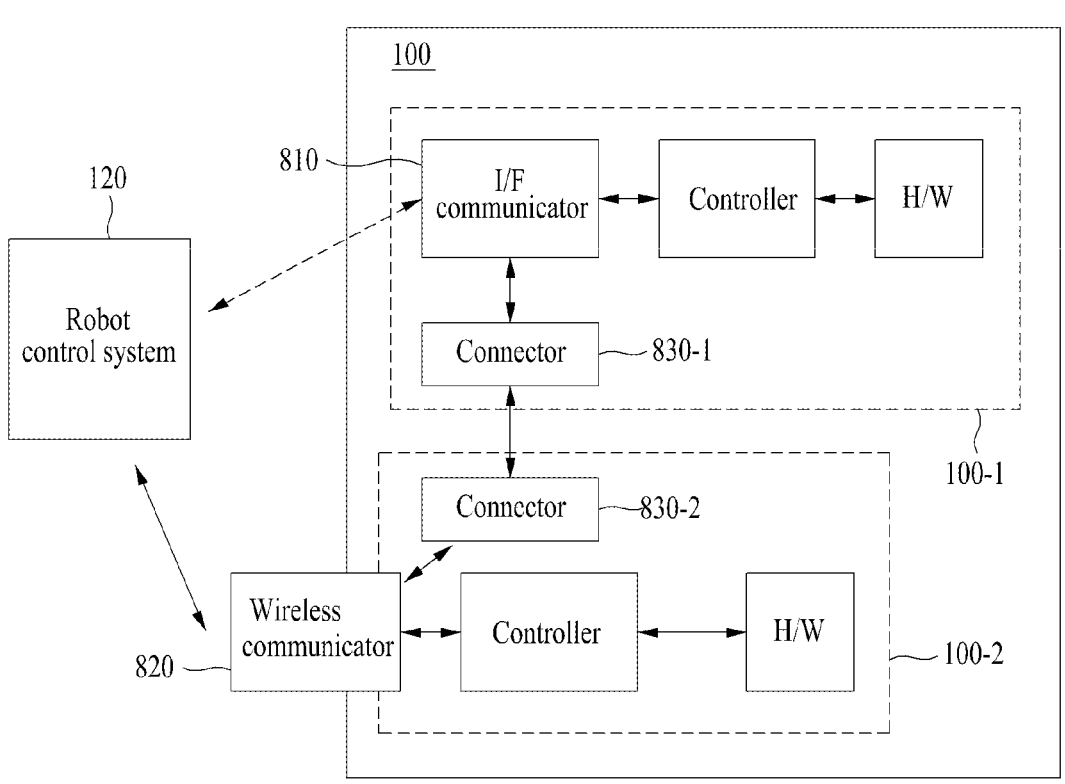
FIG. 8 is a block diagram of a robot configured with modular robots using a shared communicator according to an example.

FIG. 8 illustrates a robot configured with modular robots using a shared communicator according to an example.

As described above with reference to FIG. 4, the robot 100 may include the plurality of modular robots 100-1 to 100-3, and without interaction between the plurality of modular robots 100-1, 100-2, and 100-, each of the plurality of modular robots 100-1 to 100-3 may be individually controlled by the robot control system 120. Each of the modular robots 100-1 to 100-3 may be configured to perform a function for providing a requested service.

A controller (e.g., processor) included in the modular robot 100-1, 100-2 may be configured to transmit sensing information collected from a sensor or state information of the corresponding modular robot 100-1, 100-2 to the robot control system 120 and to receive a command based on the sensing information or the state information from the robot control system 120, and may control the modular robot 100-1, 100-2 according to the received command (to execute a function).

Although FIG. 4 illustrates that each of the plurality of modular robots 100-1 to 100-3 includes a communicator for communication with the robot control system 120, only one modular robot 100-2 of the plurality of modular robots may include a shared communicator 820 and the plurality of modular robots 100-1 and 100-2 may communicate with the robot control system 120 through the shared communicator 820, as illustrated in FIG. 8.

That is, each of the first modular robot 100-1 and the second modular robot 100-2 may communicate with the robot control system 120 using the shared communicator 820 and reception of first sensing information or first state information and reception of second sensing information or second state information (from the first modular robot 100-1 and the second modular robot 100-2 of the robot control system 120) and transmission of a first command and transmission of a second command (to the first modular robot 100-1 and the second modular robot 100-2 of the robot control system 120) may be performed through the shared communicator 820.

Here, the first modular robot 100-1 may include only an I/F communicator 810.

Remaining modular robot(s) 100-1 (without the common communicator 820) in the plurality of modular robots 100-1 and 100-2 may connect to the modular robot 100-2 including the shared communicator 820 through connectors 830-1 and 830-2, and may communicate with the robot control system 120 through the shared communicator 820. The connector may be a standard connector (using a standardized interface).

Therefore, although all of the modular robots that constitute the robot 100 are not equipped with an apparatus for wireless communication, the apparatus for wireless communication included in a specific modular robot may be shared with remaining modular robots and used. Therefore, even the modular robot not equipped with the apparatus for wireless communication may be logically connected to the robot control system 120.

The apparatus for wireless communication may be shared and used through a standard connector, e.g., commercial connectors using a standardized interface. However, modular robots constituting the robot 100 do not interact with each other and do not have interdependency. That is, although the apparatus for wireless communication is shared and used between the modular robots, mutual separation at a logical level between the modular robots may be maintained.

In a similar manner, the modular robots that constitute the robot 100 may share a battery or a power supply in a similar manner. Therefore, although each of the modular robots does not have the battery or the power supply, the robot 100 may be implemented. Alternatively, although each of the modular robots has the power supply or the battery, the modular robots may be configured to share the power supply or the battery in such a manner that the modular robots are connected through a standard connection method (e.g., the aforementioned standard connector).

Description related to technical features made above with reference to FIGS. 1 to 7 and FIGS. 9 to 11 may apply as is to FIG. 8 and thus, repeated description is omitted here.

The systems or the apparatuses described herein may be implemented using hardware components, software components, and/or a combination of the hardware components and the software components. For example, the apparatuses and the components described herein may be implemented using one or more computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be permanently or transitorily embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable recording media. The media may include, alone or in combination with program instructions, data files, data structures, and the like. The program instructions recorded in the media may be specially designed and configured for the example embodiments or may be known and available to those skilled in the computer software art. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of the program instructions include not only a machine code as produced by a compiler but also a high language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A method of controlling a first robot and a second robot, the first robot configured with a plurality of modular robots and the second robot configured with a plurality of other modular robots, the method performed by a robot control system, the method comprising:

receiving first sensing information or first state information from a first modular robot that performs a first function among the plurality of modular robots and receiving second sensing information or second state information from a second modular robot that performs a second function among the plurality of modular robots; and controlling the first modular robot by transmitting a first command to the first modular robot based on the first sensing information or the first state information, and controlling the second modular robot by transmitting a second command to the second modular robot based on the second sensing information or the second state information, wherein each of the first modular robot and the second modular robot is individually controlled by the robot control system without a direct interaction between the first modular robot and the second modular robot for controlling each other or executing a first task related to a service requested for the first robot, such that the first robot is controlled to perform the first task, each of the plurality of other modular robots is individually controlled by the robot control system without a direct interaction between the plurality of other modular robots for controlling each other or executing a second task related to a service requested for the second robot, such that the second robot is controlled to perform the second task, the first task and the second task are interrelated tasks, the first robot and the second robot configure a single virtual robot, and the first robot and the second robot are controlled to operate in conjunction with each other.

2. The method of claim 1, wherein each of the plurality of modular robots is a brainless robot that is controlled by executing a command from the robot control system, without each of the plurality of modular robots directly interacting with another robot or another modular robot for controlling each other or executing the first task.

3. The method of claim 1, further comprising:

receiving a request for the first task related to the service requested for the first robot, wherein the controlling the first modular robot and the controlling the second modular robot comprise generating the first command based on a result of interpreting the request and the first sensing information or the first state information, and generating the second command based on a result of interpreting the request and the second sensing information or the second state information.

4. The method of claim 3, wherein the first command is generated using information obtained from a predefined first functional element in association with the first function, and the second command is generated using information obtained from a predefined second functional element in association with the second function.

5. The method of claim 3, wherein the generating of the second command comprises generating the second command further based on the first sensing information or the first state information, and the second modular robot is controlled according to the second command generated further based on the first sensing information or the first state information.

6. The method of claim 1, further comprising:

configuring a first module controller for controlling the first modular robot and a second module controller for controlling the second modular robot, wherein the first sensing information or the first state information is received from the first modular robot and the first command is transmitted to the first modular robot using the first module controller corresponding to the first modular robot, the second sensing information or the second state information is received from the second modular robot and the second command is transmitted to the second modular robot using the second module controller corresponding to the second modular robot, and the first module controller and the second module controller correspond to the first modular robot and the second modular robot on a one-to-one basis, respectively.

7. The method of claim 6, further comprising:

in response to a request for control of a third modular robot that performs a third function among the plurality of modular robots to perform a third task, configuring a third module controller for controlling the third modular robot, wherein the third module controller corresponds to the third modular robot on a one-to-one basis.

8. The method of claim 1, wherein each of the first modular robot and the second modular robot communicates with the robot control system using a shared communicator, and reception of the first sensing information or the first state information, reception of the second sensing information or the second state information, transmission of the first command, and transmission of the second command are performed through the shared communicator.

9. The method of claim 1, wherein each of the first robot and the second robot is controlled by a robot controller independently configured in the robot control system.

10. The method of claim 1, wherein each of the first robot and the second robot is controlled by a common robot controller of the robot control system.

11. The method of claim 1, wherein the first function is a function for moving the first robot and the first modular robot is a mobile base modular robot configured to move the first robot, the second function is a function for providing the service and the second modular robot is a service modular robot configured to provide the service of the first robot, and the first robot is configured through combination of the first modular robot and the second modular robot.

12. A robot control system for controlling a first robot and a second robot, the first robot configured with a plurality of modular robots and the second robot configured with a plurality of other modular robots, the robot control system comprising:

at least one processor configured to execute computer-readable instructions, wherein the at least one processor is configured to receive first sensing information or first state information from a first modular robot that performs a first function among the plurality of modular robots, receive second sensing information or second state information from a second modular robot that performs a second function among the plurality of modular robots, control the first modular robot by transmitting a first command to the first modular robot based on the first sensing information or the first state information, and control the second modular robot by transmitting a second command to the second modular robot based on the second sensing information or the second state information, each of the first modular robot and the second modular robot is individually controlled by the robot control system without a direct interaction between the first modular robot and the second modular robot for controlling each other or executing a first task related to a service requested for the first robot, such that the first robot is controlled to perform the first task, each of the plurality of other modular robots is individually controlled by the robot control system without a direct interaction between the plurality of other modular robots for controlling each other or executing a second task related to a service requested for the second robot, such that the second robot is controlled to perform the second task, the first task and the second task are interrelated tasks, the first robot and the second robot configure a single virtual robot, and the first robot and the second robot are controlled to operate in conjunction with each other.

13. The robot control system of claim 12, wherein the at least one processor comprises a first module controller for controlling the first modular robot and a second module controller for controlling the second modular robot, the first module controller corresponding to the first modular robot is configured to receive the first sensing information or the first state information from the first modular robot and transmit the first command to the first modular robot, the second module controller corresponding to the second modular robot is configured to receive the second sensing information or the second state information from the second modular robot and transmit the second command to the second modular robot, the first module controller and the second module controller correspond to the first modular robot and the second modular robot, respectively, on a one-to-one basis, and in response to a request for control of a third modular robot that performs a third function among the plurality of modular robots to perform a third task, the at least one processor is configured to generate a third module controller for controlling the third modular robot.

14. The robot control system of claim 12, wherein the at least one processor comprises a first robot controller configured to control the first robot and a second robot controller configured to control the second robot, and the first robot controller and the second robot controller are independently configured.

15. The robot control system of claim 12, wherein the at least one processor comprises a common robot controller, and each of the first robot and the second robot is controlled by the common robot controller.

16. A number of robots controlled by a robot control system to provide a service within a space, the number of robots comprising:

a first robot having a plurality of modular robots, and a second robot having a plurality of other modular robots, wherein each of the plurality of modular robots is individually controlled by the robot control system without a direct interaction between the plurality of modular robots for controlling each other or executing a first function for providing the service, each of the plurality of other modular robots is individually controlled by the robot control system without a direct interaction between the plurality of other modular robots for controlling each other or executing a second function for providing the service, each modular robot of the plurality of modular robots is configured to perform the first function, each other modular robot of the plurality of other modular robots is configured to perform the second function, the first function and the second function are interrelated functions, the first robot and the second robot configure a single virtual robot, the first robot and the second robot are controlled to operate in conjunction with each other, the each modular robot comprises at least one processor configured to execute computer-readable instructions, and the at least one processor is configured to transmit sensing information or state information of the each modular robot to the robot control system, receive a command from the robot control system based on the sensing information or the state information, and control the each modular robot according to the command.

17. The number of robots of claim 16, wherein a shared communicator is configured to connect to the plurality of modular robots through a connector to enable the robot control system through the shared communicator.

18. The number of robots of claim 16, wherein the plurality of modular robots comprises:

a mobile base modular robot configured to provide a function for moving the first robot; and a service modular robot configured to provide a function for providing the service, and the first robot is configured through combination of the mobile base modular robot and the service modular robot.

19. A building comprising:

a first robot configured with a plurality of modular robots moving through a space within the building, a second robot configured with a plurality of other modular robots, the first robot and the second robot each being controlled by a robot control system, the robot control system including at least one processor configured to execute computer-readable instructions, wherein the at least one processor is configured to receive first sensing information or first state information from a first modular robot that performs a first function among the plurality of modular robots, receive second sensing information or second state information from a second modular robot that performs a second function among the plurality of modular robots, control the first modular robot by transmitting a first command to the first modular robot based on the first sensing information or the first state information, and control the second modular robot by transmitting a second command to the second modular robot based on the second sensing information or the second state information, each of the first modular robot and the second modular robot is individually controlled by the robot control system without a direct interaction between the first modular robot and the second modular robot for controlling each other or executing a first task related to a service requested for the first robot, such that the first robot is controlled to perform the first task, each of the plurality of other modular robots is individually controlled by the robot control system without a direct interaction between the plurality of other modular robots for controlling each other or executing a second task related to a service requested for the second robot, such that the second robot is controlled to perform the second task, the first task and the second task are interrelated tasks, the first robot and the second robot configure a single virtual robot, and the first robot and the second robot are controlled to operate in conjunction with each other.

20. A building comprising:

a first robot configured with a plurality of modular robots moving through a space within the building and controlled by a robot control system, a second robot configured with a plurality of other modular robots controlled by the robot control system, wherein each of the plurality of modular robots is individually controlled by the robot control system without a direct interaction between the plurality of modular robots for controlling each other or executing a first function for providing a service within the space, each of the plurality of other modular robots is individually controlled by the robot control system without a direct interaction between the plurality of other modular robots for controlling each other or executing a second function for providing the service within the space, each modular robot of the plurality of modular robots is configured to perform the first function, each other modular robot of the plurality of other modular robots is configured to perform the second function, the first function and the second function are interrelated functions, the first robot and the second robot configure a single virtual robot, the first robot and the second robot are controlled to operate in conjunction with each other, the each modular robot includes at least one processor, and the at least one processor is configured to transmit sensing information or state information of the each modular robot to the robot control system, receive a command from the robot control system based on the sensing information or the state information, and control the each modular robot according to the command.

\* \* \* \* \*